United States Patent Office 3,745,073

Patented July 10, 1973

3,745,073
SINGLE-STEP PROCESS FOR MAKING p-n JUNCTIONS IN ZINC SELENIDE

Zoltan K. Kun, Skokie, and Robert J. Robinson, Park Ridge, Ill., assignors to Zenith Radio Corporation, Chicago, Ill.

No Drawing. Filed Feb. 26, 1971, Ser. No. 119,370
Int. Cl. H01l 7/62
U.S. Cl. 148—189 1 Claim

ABSTRACT OF THE DISCLOSURE

P-n junctions are formed by simultaneous doping of a thin surface layer of an n-type zinc selenide substrate with zinc and with gallium, indium or thallium. Doping may be effected by vapor phase in-diffusion or by submersion of the substrate in an alloy melt containing both dopants.

BACKGROUND OF THE INVENTION

This invention relates to the production of p-n junctions in zinc selenide, for use in visible light emitting diodes, bipolar transistors and other semiconductor devices.

In the copending application of Zoltan K. Kun and Robert J. Robinson, Ser. No. 119,240, now Pat. No. 3,670,220 filed concurrently herewith for Method of Forming p-n Junctions in ZnSe, ZnS, or ZnS/ZnSe and Semiconductor Devices Comprising Such Junctions and assigned to the same assignee as the present application, there is disclosed and claimed a method of forming p-n junctions in wide band gap zinc chalcogenide semiconductor materials, i.e., zinc sulfide, zinc selenide and the zinc sulfo-selenides. The method of the copending application comprises double doping of the wide band gap zinc chalcogenide material, which may be either intrinsic or n-doped, with elemental gallium, indium or thallium and with zinc. The invention disclosed and claimed in the copending application is addressed to the double doping process, whether the two doping steps are carried out simultaneously or sequentially. The present application is addressed to the discovery that, in the special case of a zinc selenide substrate, double doping with the Group III metal and with zinc can be effectively accomplished in a single-step double doping process by simultaneous vapor phase in-diffusion of both dopants or by submersion of the zinc selenide substrate in an alloy melt containing both dopants.

Accordingly, it is a primary object of the present invention to provide a new improved and simplified process for forming p-n junctions in zinc selenide.

It is a more particular object of the invention to provide a process for forming p-n junctions in zinc selenide with a majority carrier conductivity on the p-side of the junction at least of the order of $10^{16}$ holes per cubic centimeter.

In accordance with the present invention, a new and improved method of forming a p-n junction in zinc selenide comprises the steps of providing an n-doped zinc selenide substrate, and simultaneously doping the substrate with gallium, indium or thallium and with zinc.

The features of the present invention which are believed to be novel are set forth with particularity in the appended claims. The invention, as well as further objects and advantages thereof, may be better understood by reference to the following description.

More specifically, the process of the present invention involves either simultaneous vapor phase in-diffusion of gallium, indium or thallium and zinc into a thin surface layer of a substrate of n-type zinc selenide, or submersion of an n-type zinc selenide substrate in a molten alloy of zinc with gallium, indium or thallium. The process yields p-n junctions with majority carrier concentrations at least of the order of $10^{16}$ to $10^{17}$ holes per cubic centimeter on the p-conductivity side, and the p-n junctions thus produced emit visible light in the red/orange to yellow/green portion of the visible spectrum. When vapor phase in-diffusion is employed to effect the simultaneous double doping of the zinc selenide substrate, an excess of zinc selenide vapor is also provided to prevent out-diffusion of selenium atoms from the substrate. The processing times and temperatures may be varied within rather broad limits without major effects on the resistivity of the resulting p-type surface layer or on the stability of the resulting p-n junctions.

The following specific examples of the inventive process are presented as preferred embodiments.

Example 1

Using a single crystal of zinc selenide which has been doped n-conductive in accordance with the process described and claimed in the Catano Pat. No. 3,544,468, issued Dec. 1, 1970 and assigned to the present assignee, the surface is lapped, polished and etched to optimum flatness and cleanliness. Doping is accomplished in a single step by placing the sample in one end of a sealed and evacuated ½ inch quartz capsule containing a 50% zinc, 50% gallium alloy by weight, with zinc selenide powder at the other end of the capsule. The formation of a p-conductive surface layer to complete a p-n junction is accomplished by heating in the range of 800° centigrade to 1100° centigrade for at least five minutes with approximately a 10° centrigrade temperature gradient between the two ends of the capsule, the n-doped zinc selenide sample being maintained at the lower temperature. The sample is then air quenched to room temperature. This process yields a p-n junction with a majority carrier concentration of the order of $10^{16}$ holes per cubic centimeter on the p-conductivity side. The junction responds to applied current to emit visible light in the red/orange to yellow/green portion of the spectrum depending upon variations in time and temperature, longer times and higher temperatures yielding longer emission wavelengths.

Example 2

A lapped, polished and etched substrate of n-doped zinc selenide prepared in accordance with the Catano process is submerged in an alloy of 90% indium and 10% zinc by weight at a temperature of 700° centrigrade for about one hour. On air quenching of the sample, a p-n junction is obtained which emits light in the orange portion of the visible spectrum and exhibits a majority carrier concentration of from $10^{16}$ to $10^{17}$ holes per cubic centimeter on the p-conductivity side of the junction.

Example 3

An n-doped zinc selenide single crystal substrate, properly lapped, polished and cleaned, is submerged in a molten alloy of 10% thallium and 90% zinc by weight at a temperature of 700° centigrade for about one hour. Visible light emission in the orange portion of the spectrum is obtained from the resulting p-n-junction, which exhibits a majority carrier concentration of from $10^{16}$ to $10^{17}$ holes per cubic centimeter on the p-side of the junction.

Thus the present invention provides a greatly improved and simplified single-step process for forming p-n junctions in zinc selenide for use in visible light emitting diodes, bipolar transistors, and other p-n junction semiconductor devices.

While particular embodiments of the invention have been described, it will be obvious to those skilled in the art that changes and modifications may be made without departing from the invention in its broader aspects, and, therefore, the aim in the appended claim is to cover all such changes and modifications as fall within the true spirit and scope of the invention.

We claim:

1. A process of forming a p-n junction in zinc selenide which comprises:

providing a substrate of n-type zinc selenide;

and simultaneously doping said substrate by vapor in-diffusion with elemental gallium, indium or thallium and with zinc.

References Cited

UNITED STATES PATENTS

| | | | |
|---|---|---|---|
| 3,578,507 | 5/1971 | Chiang et al. | 148—189 X |
| 3,496,429 | 2/1970 | Robinson | 148—175 UX |
| 3,544,468 | 12/1970 | Catano | 252—62.3 ZT |
| 3,670,220 | 6/1972 | Kun et al. | 148—190 |

GEORGE T. OZAKI, Primary Examiner

U.S. Cl. X.R.

148—186, 187, 188, 190; 252—62.3 ZT; 317—237 R